(12) United States Patent
Ahn et al.

(10) Patent No.: US 12,508,600 B2
(45) Date of Patent: Dec. 30, 2025

(54) HORIZONTAL BEAD MILL FOR DISPERSING SECONDARY BATTERY MATERIAL, AND CONDUCTIVE MATERIAL DISPERSION METHOD

(71) Applicant: LG Energy Solution, Ltd., Seoul (KR)

(72) Inventors: Byoung Hoon Ahn, Daejeon (KR); Hyung Suk Cho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 429 days.

(21) Appl. No.: 17/914,199

(22) PCT Filed: Sep. 17, 2021

(86) PCT No.: PCT/KR2021/012875
§ 371 (c)(1),
(2) Date: Sep. 23, 2022

(87) PCT Pub. No.: WO2022/119087
PCT Pub. Date: Jun. 9, 2022

(65) Prior Publication Data
US 2023/0110147 A1    Apr. 13, 2023

(30) Foreign Application Priority Data
Dec. 1, 2020 (KR) .......................... 10-2020-0165394

(51) Int. Cl.
*B02C 17/04* (2006.01)
*B02C 17/16* (2006.01)
*H01M 4/04* (2006.01)

(52) U.S. Cl.
CPC ............ *B02C 17/163* (2013.01); *B02C 17/04* (2013.01); *B02C 17/161* (2013.01); *H01M 4/0483* (2013.01)

(58) Field of Classification Search
CPC ..... B02C 17/163; B02C 17/04; B02C 17/161; B02C 17/002; B02C 17/14; B02C 17/16;
(Continued)

(56) References Cited

U.S. PATENT DOCUMENTS

| | | |
|---|---|---|
| 2011/0121115 A1 | 5/2011 | Lang et al. |
| 2011/0168814 A1 | 7/2011 | Brook-Levinson et al. |
| 2020/0324297 A1 | 10/2020 | Pausch et al. |

FOREIGN PATENT DOCUMENTS

| | | |
|---|---|---|
| CN | 2478680 Y | 2/2002 |
| CN | 102164676 A | 8/2011 |

(Continued)

OTHER PUBLICATIONS

Machine translation of CN 206082697 (Year: 2017).*
(Continued)

*Primary Examiner* — Matthew Katcoff
(74) *Attorney, Agent, or Firm* — Lerner David LLP

(57) ABSTRACT

A horizontal bead mill for dispersing secondary battery materials and a method for dispersing conductive materials using the horizontal bead mill for dispersing the secondary battery materials are provided. The horizontal bead mill includes a vessel including an inlet and an outlet configured to receive disperse media. The vessel is filled with beads. A rotor is rotated in the vessel to rotate the beads to disperse the disperse media. A driving unit rotates the rotor. An inner surface of a sidewall of the vessel is inclined at a predetermined angle for an axis of the rotor in a manner that an inner diameter of the vessel gradually decreases from an inlet side to an outlet side.

12 Claims, 4 Drawing Sheets

(58) Field of Classification Search
CPC .............. B02C 17/1815; B02C 17/184; B02C 17/1855; B02C 17/186; H01M 4/0483
USPC ........................................................ 241/22
See application file for complete search history.

(56) References Cited

FOREIGN PATENT DOCUMENTS

| | | | |
|---|---|---|---|
| CN | 104841942 A | | 8/2015 |
| CN | 206082697 U | | 4/2017 |
| CN | 108325420 A | | 7/2018 |
| CN | 109836542 A | | 6/2019 |
| CN | 209531038 U | | 10/2019 |
| CN | 110898944 A | | 3/2020 |
| CN | 210314030 U | | 4/2020 |
| EP | 1358940 A1 | | 11/2003 |
| JP | H06031189 A | | 2/1994 |
| JP | H0899047 A | | 4/1996 |
| JP | 2001025653 A | | 1/2001 |
| JP | 2004025168 A | | 1/2004 |
| JP | 2012045456 A | * | 3/2012 |
| JP | 2013059723 A | | 4/2013 |
| JP | 2014042875 A | * | 3/2014 |
| JP | 2020116548 A | | 8/2020 |
| KR | 20110058721 A | | 6/2011 |
| KR | 20160010991 A | | 1/2016 |
| KR | 101612616 B1 | * | 4/2016 |
| KR | 101708376 B1 | | 2/2017 |
| KR | 101728081 B1 | | 4/2017 |
| KR | 20190109500 A | | 9/2019 |

OTHER PUBLICATIONS

Machine translation of JP 2012045456 (Year: 2012).*
Machine translation of JP H08-99047 (Year: 1996).*
Extended European Search Report for Applicationm No. 21900775.4 dated Oct. 10, 2023. 8 pgs.
International Search Report for PCT/KR2021/012875 mailed Dec. 30, 2021. 3 pgs.
Search Report dated May 10, 2023 from the Office Action for Chinese Application No. 202180021053.X issued May 12, 2023, pp. 1-3. [See p. 1, categorizing the cited references].

* cited by examiner

[FIG. 1]
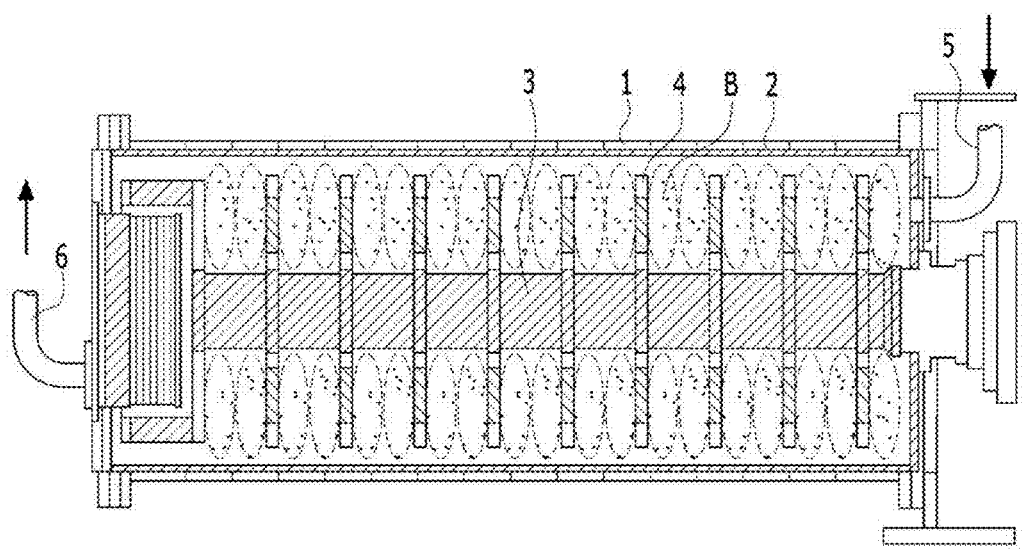
PRIOR ART

[FIG. 2]
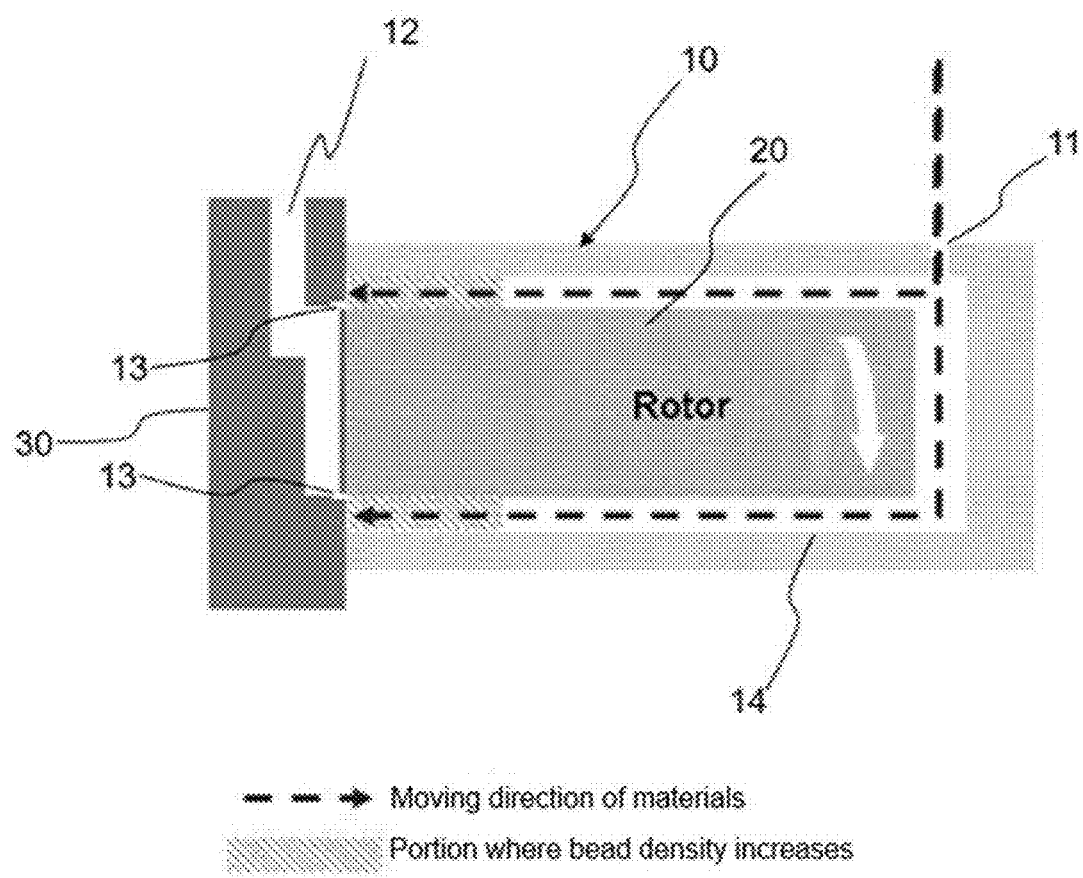
PRIOR ART

[FIG. 3]
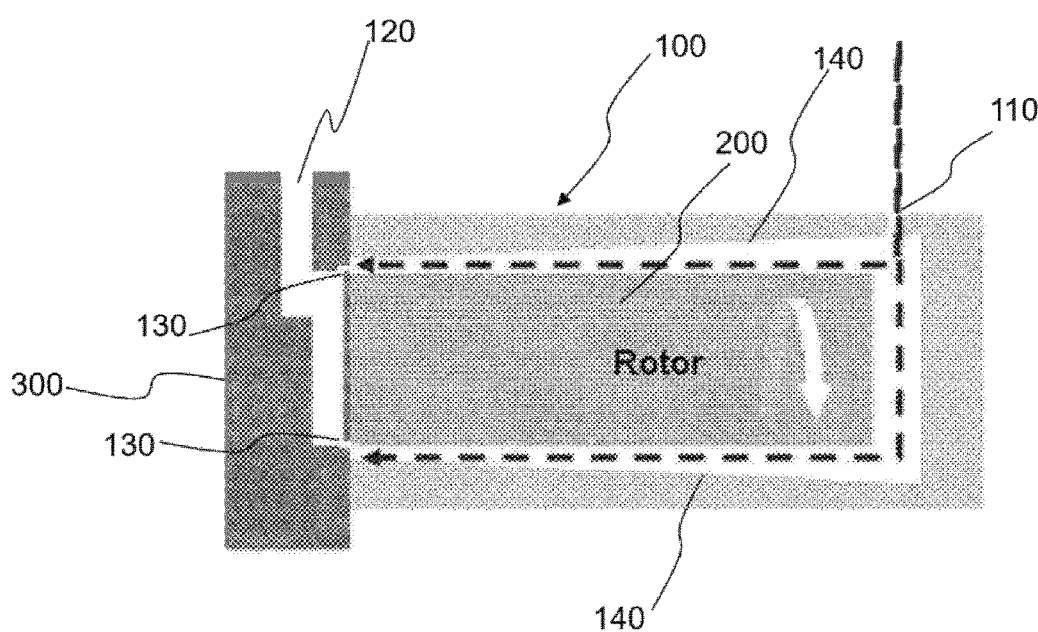

[FIG. 4]
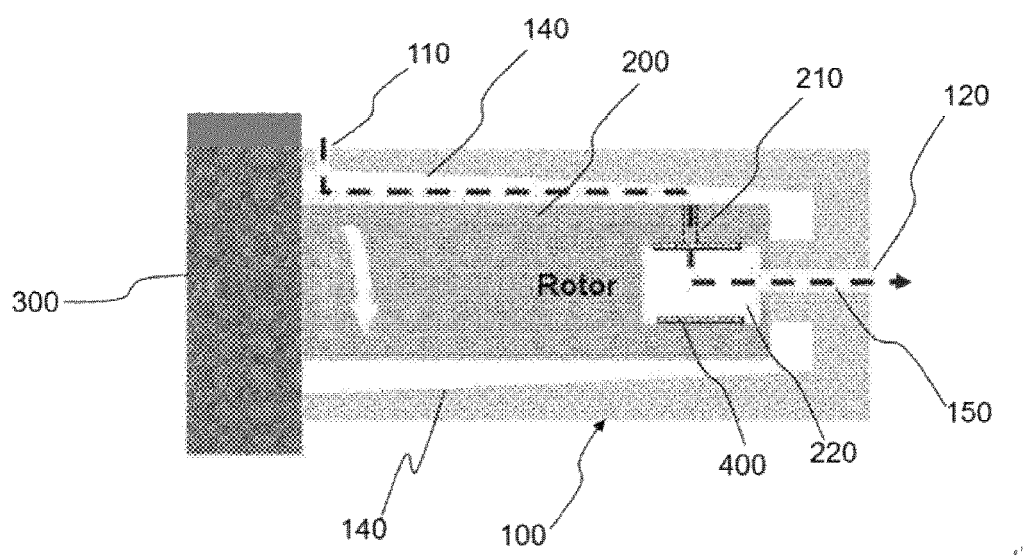

HORIZONTAL BEAD MILL FOR DISPERSING SECONDARY BATTERY MATERIAL, AND CONDUCTIVE MATERIAL DISPERSION METHOD

CROSS-REFERENCE TO RELATED APPLICATIONS

The present application is a national stage entry under 35 U.S.C. § 371 of International Application No. PCT/KR2021/012875 filed on Sep. 17, 2021, which claims priority from Korean Patent Application No. 10-2020-0165394 filed on Dec. 1, 2020, the disclosures of which are incorporated herein by reference.

TECHNICAL FIELD

The present invention relates to a horizontal bead mill, and a method of dispersing materials using the horizontal bead mill. More particularly, the present invention relates to a horizontal bead mill for dispersing materials used for a secondary battery, and a method of dispersing conductive materials.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In order to manufacture a positive electrode and a negative electrode, which are electrodes of a secondary battery, an electrode slurry is applied on the surface of a current collector made of an aluminum or copper plate, which is then dried to obtain an electrode substrate, which is then tab-processed and is cut into an appropriate size. The electrode slurry is applied on the surface of the current collector in a form in which a solvent is mixed with active materials, conductive materials, and binders, and is manufactured as an electrode substrate.

Since the surface energy of conductive materials in the electrode slurry is large due to the small particle size and the large specific surface area, the particles tend to be agglomerated. Hence, in the case that conductive materials and a solvent are mixed in a mixer and a conductive material dispersion liquid is prepared, the conductive material particles tend to be agglomerated in the solvent. As such, the agglomerated particles need to be dispersed into an individual particle form.

Further, binders may be melted by applying heat to be added to an electrode slurry. At this time, some binders may remain in the form of particles (microgel).

Hence, a bead mill is used to disperse such conductive materials or additionally melt the microgels.

FIG. 1 shows a schematic diagram of a conventional disk mill type horizontal bead mill.

The bead mill includes a housing 1 including an inlet 5 and an outlet 6, a vessel 2 which is positioned in the housing 1 and where particles are dispersed, beads (B), and a rotor 3 which is installed in the vessel 2 and is rotated. The bead mill is a disk mill type equipped with disk-shaped stirring blades 4 around the rotor 3.

Further, there are various types of bead mills such as the above-described disk mill, a spike mill which includes a cylindrical rotor around the axis of the rotor, etc., depending on the type of the rotor.

FIG. 2 is a schematic diagram of a conventional spike mill type horizontal bead mill. As shown in FIG. 2, a drum-shaped rotor 20 is mounted around the axis of the rotor.

In the bead mill of FIG. 2, disperse media are injected into the vessel 10 through the inlet 11 and are then discharged through the outlet 12 via the slit 13. In this process, the disperse media are dispersed as beads (not shown) are rotated by rotation of the rotor 20 driven by the driving unit 30. Specifically, force is applied to beads from the surface of the rotor in a direction perpendicular to the axis of the rotor by rotation of the rotor, and the beads are bumped into the surface 14 of the inner wall of the vessel and are rotated to thereby transfer energy to disperse media.

Likewise, in the horizontal bead mill of FIGS. 1 and 2, materials, which are disperse media, are moved from the inlet to the outlet, and in this process, beads are rotated in the vessel according to the rotation of the rotor to give energy to materials, to thereby allow dispersion of the materials.

However, if the moving speed of the materials is set to be high to enhance the process productivity of the bead mill, the beads are moved in the transfer direction of the materials by the flow of the materials. At this time, as the bead density in an area around the outlet increases, the internal pressure of the vessel increases, thereby decreasing the dispersion efficiency. Namely, force generated by rotor rotation and force generated by the flow of materials are applied to beads. When the moving speed of materials is small, beads may not be moved much, but when the moving speed of materials is high, the bead density increases, and the beads will be piled up in an area around the outlet as shown in FIG. 2.

Hence, there is a need for a technology for improving the dispersion efficiency by improving the problem that the bead density increases in the moving direction of materials in a horizontal bead mill.

PRIOR ART LITERATURE

Patent Document

Korean Patent No. 10-1708376

DISCLOSURE

Technical Problem

The present invention is believed to solve at least some of the above problems. For example, an aspect of the present invention provides a material dispersion method capable of preventing the increase of the bead density at the outlet side of a bead mill by allowing force to be applied to beads in a direction opposite to the moving direction of materials of the horizontal bead mill during the material dispersion process.

Further, an aspect of the present invention provides a material dispersion method in a horizontal bead mill, which can prevent the increase of the bead density at the outlet side.

Technical Solution

A horizontal bead mill for dispersing secondary battery materials of the present invention for solving the above problems includes: a vessel which includes an inlet and an outlet for disperse media and is filled with beads; a rotor which is rotated in the vessel to rotate the beads to thereby disperse the disperse media; and a driving unit which rotates the rotor, in which an inner surface of a sidewall of the vessel is inclined at a predetermined angle with respect to an axis of the rotor and is formed as an inclined portion whose inner diameter gradually decreases from an inlet side toward an outlet side.

In one example, the disperse media are a conductive material dispersion liquid which is obtained as conductive material particles contained in a secondary battery electrode slurry are dispersed in a solvent.

Binder particles may be contained in the conductive material dispersion liquid.

In another example, the disperse media are melted binders contained in the secondary battery electrode slurry, and the melted binders may contain non-melted microgel binder particles.

Specifically, an angle between the inner surface of the sidewall of the vessel and the axis of the rotor may be in a range of 1 to 3 degrees.

When the disperse media are a conductive material dispersion liquid, a moving speed of the conductive material may be greater than 2.0 to 3.0 L/min.

In one example, a slit communicating with the outlet is formed adjacent to the outlet of the vessel, and the slit has a diameter through which only the dispersion medium selectively passes.

Further, a mesh-shaped screen communicating with the outlet is installed adjacent to the outlet of the vessel, and wherein the screen has mesh holes through which only the disperse media are allowed to pass.

Specifically, an internal cavity, which communicates with the outlet and an outside of the rotor, respectively, is formed at the outlet side of the rotor, and the screen may be installed in the internal cavity.

In one example, the rotor may have a flow path for cooling water. Alternatively, bumps may be formed on a surface of the rotor.

Further, the bead mill may be a spike mill which includes a cylindrical rotor, or a disk mill which includes a disk-shaped stirring blade around the axis of the rotor.

A method of dispersing conductive materials using a horizontal bead mill for dispersing secondary battery materials of the present invention includes: injecting a conductive material dispersion liquid into a vessel filled with beads; dispersing conductive materials in the conductive material dispersion liquid by rotating the beads by rotating a rotor in the vessel; and discharging the dispersed conductive material dispersion liquid to an outlet of the vessel, in which during the dispersing of the conductive materials, the beads rotated by the rotor collide with an inclined inner surface of a sidewall of the vessel to thereby allow force to be applied in a direction opposite to a moving direction of the conductive material dispersion liquid.

Advantageous Effects

According to the present invention, it is possible to enhance the dispersion efficiency by preventing the increase of the bead density in the moving direction of materials by an inclined portion formed on the surface of the inner wall of the horizontal bead mill.

Further, even if the moving speed of materials increases, it is possible to maintain the dispersibility while improving the productivity (moving speed of materials) by suppressing the increase of the bead density.

BRIEF DESCRIPTION OF THE DRAWINGS

FIG. 1 shows a schematic diagram of a conventional disk mill type horizontal bead mill.

FIG. 2 is a schematic diagram of a conventional spike mill type horizontal bead mill.

FIG. 3 is a schematic diagram of a horizontal bead mill according to a first embodiment of the present invention.

FIG. 4 is a schematic diagram of a horizontal bead mill according to a second embodiment of the present invention.

DETAILED DESCRIPTION OF THE EMBODIMENTS

Hereinafter, the detailed configuration of the present invention will be described in detail with reference to the accompanying drawings and various embodiments. Embodiments described below are exemplary to assist in understanding of the present invention, and in order to help understand the invention, the accompanying drawings are not shown as actual scale and the dimensions of some components may be exaggerated.

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

A horizontal bead mill for dispersing secondary battery materials includes: a vessel which includes an inlet and an outlet for disperse media and is filled with beads; a rotor which is rotated in the vessel to rotate the beads to thereby disperse the disperse media; and a driving unit which rotates the rotor. The present invention is characterized in that an inner surface of a sidewall of the vessel is formed as an inclined portion which is inclined at a predetermined angle for an axis of the rotor. Namely, an inner surface of a sidewall of the vessel is inclined at a predetermined angle for an axis of the rotor in a manner that an inner diameter of the vessel gradually decreases from an inlet side to an outlet side in order to prevent beads to be moved to the outlet side by the flow of materials.

The action of this inclined portion will be described with reference to specific embodiments.

First Embodiment

FIG. 3 is a schematic diagram of a horizontal bead mill according to a first embodiment of the present invention.

The material movement direction is represented by a dotted arrow.

The bead mill has a vessel 100 including an inlet 110 and an outlet 120 of disperse media.

In the present embodiment, the disperse media are a conductive material dispersion liquid which is obtained as conductive material particles contained in a secondary battery electrode slurry are dispersed in a solvent. As described above, since conductive material particles have a large specific surface area, they are agglomerated even if they are mixed by a mixer in the horizontal bead mill. Hence, the agglomeration phenomenon should be resolved by dispersing the particles by injecting them into the horizontal bead mill.

Binder particles may be contained in the conductive material dispersion liquid. It is possible to disperse only conductive materials in a solvent according to the secondary battery manufacturing process, but in some cases, it is possible to manufacture a conductive material-binder dispersion liquid, and this dispersion liquid may also be dispersed in the horizontal bead mill of the present invention.

Further, as melted binders included in the secondary battery electrode slurry as the disperse media, melted binders containing non-melted microgel binder particles may be used.

Since the microgel particles may be melted through the dispersion process in the horizontal bead mill, the melted binders may also be used as the disperse media.

In the present invention, disperse media refer to a conductive material dispersion liquid and melted binders, but in some cases, the disperse media may also refer to microgel particles and conductive materials suspended in the dispersion liquid. Since the agglomerated state of the conductive material particles and microgel particles is resolved in the horizontal bead mill, these particles themselves may also be referred as the disperse media.

The vessel 100 may further include a housing. However, in the present embodiment, a vessel 100 is shown in a chamber form in which a housing is integrated for clarification of the illustration. An inlet 110 is formed at one end (right side of FIG. 3) of the vessel 100, and disperse media are injected through the inlet 110. An outlet 120 is formed at the other end of the vessel 100 to allow disperse media to be discharged.

Beads are filled in the vessel 100 as shown in FIG. 1. The size of each of the beads may be determined in consideration of the particle size of the disperse media. When the subjects of dispersion are conductive material particles, the bead size may be in a range of 0.5 to 1.0 mm. The beads should have a size at which the subject particles can be efficiently dispersed and the beads can be efficiently separated from the subject particles. Beads, which are filled in the vessel 100, are not shown in FIGS. 2 and 3 for the convenience of illustration (the same is applied to FIG. 4).

A rotor 200, which is rotated by a driving unit 300, is installed in the vessel 100. As the rotor 200 is rotated, beads are rotated while stirring disperse media. In the present embodiment, the rotor 200 is composed of a cylindrical drum. A bead mill including such a cylindrical rotor 200 is called a spike mill. Spike-shaped bumps are formed on the surface of the drum-shaped rotor surface of the rotor 200 (not shown). The bumps also contribute to stirring and dispersion of disperse media according to the rotation of the rotor. The axis of the rotor 200 is installed to be connected to the driving unit 300 in the rotor 200. Since the structure of the inner wall of the vessel 100 is important in the present invention, the configuration of the rotor was simply shown, and the axis of the rotor in the rotor 200 was also omitted.

A slit 130 (or a gap), which communicates with the outlet 120, is formed at a position adjacent to the outlet 120 of the vessel 100. The slit 130 has a diameter which allows only disperse media to pass and does not allow beads to pass. Namely, the slit 130 allows only disperse media to pass. For example, when the diameter of the beads is 1.0 mm, the slit 130 may be set to have a diameter of 0.3 mm to block the passage of the beads. On the other hand, liquid disperse media having dispersed particles (for example, conductive material particles) may be easily discharged through the outlet 120 via the slit 130. In the embodiment of FIG. 3, disperse media, which are injected through the inlet 110, are discharged through the outlet 120 via the slit 130 installed at both sides of the outlet 120 of the vessel 100.

The present invention is characterized in that an inner surface of a sidewall of the vessel 100 is formed as an inclined portion 140 which is inclined at a predetermined angle for an axis of the rotor. Particularly, the inclined portion 140 is formed to be inclined from the inlet side of the vessel 100 to the outlet side of the vessel 100. Namely, the inner diameter at the inlet side of the vessel 100 is large, but the inner diameter gradually decreases toward the outlet side in the inclined portion 140. In this configuration, when beads, which are bumped into the surface of the rotor and are bumped in a direction perpendicular to the rotor 200, are bumped into the inner surface of the sidewall of the vessel 100, the surface of the inclined portion 140 is inclined to the inlet 110 side. As such, an impact is given to the beads in a direction against the moving direction of the materials toward the outlet 120. Namely, the inner surface of the sidewall of the inclined portion 140 acts to allow force to be applied to beads in a direction opposite to the moving direction of materials.

On the other hand, in the conventional horizontal bead mill as in FIGS. 1 and 2, force is applied to beads to return to the rotor. Force is applied to the beads in a direction in which materials are moved, and the beads are piled up at an area around the outlet of materials as in FIG. 2. When the flowing speed of the materials increases, such a bead density increase phenomenon intensifies. The present invention prevents such a phenomenon by forming the inner surface of the vessel to allow force to be applied in a direction against the moving direction of the materials during the dispersion process of beads.

On the other hand, the inclined angle of the inclined portion 140 of the inner surface of the sidewall of the vessel should be carefully decided. If the inclined angle is too small, there is a possibility that beads are moved in a direction in which the materials are moved. Further, if the inclined angle is too large, the gap between the rotor 200 and the inner surface of the sidewall may become too large (inlet side), or the gap between the rotor 200 and the inner surface of the sidewall may become too small (outlet side). Hence, the inclined angle of the inclined portion 140 should be appropriately decided so that force may be effectively applied to beads in a direction against the moving direction of materials within a range that the above problems do not occur.

Further, the inclined angle may be related to the moving speed of the materials. Extremely speaking, when the moving speed of materials is not large, the inclined portion 140 does not need to be installed. However, if the moving speed of materials exceeds a certain value and the density of beads increases at an area around the outlet 120, the inclined portion 140 needs to be formed. Further, the inclined angle of the inclined portion 140 may be changed according to the moving speed of materials. In addition, the inclined angle of the inclined portion 140 may be decided within a range in which the objects of the present invention can be achieved in consideration of the type and particle size of the disperse media. The inclined angle of the inclined portion 140 in the case that disperse media is a conductive material dispersion liquid will be explained with reference embodiments to be described later.

Second Embodiment

FIG. 4 is a schematic diagram of a horizontal bead mill according to a second embodiment of the present invention.

In FIG. 3, beads are separated from disperse media through a slit-type gap communicating with the outlet, but in FIG. 4, a horizontal bead mill of a screen separation scheme, in which separation is performed by a screen, is used. That is, FIG. 4 illustrates an example of applying the present invention to a horizontal bead mill which uses a screen separation scheme.

In the bead mill of FIG. 4, the inlet 110 is formed in the left side, and the outlet 120 is formed in the right side, which is the opposite in the bead mill of FIG. 3. Disperse media are injected through the inlet formed in the left side of the vessel 100 and are then discharged through the outlet 120 in the right side of the vessel 100.

A rotor 200, which is rotated by a driving unit 300, is installed in the vessel 100. As the rotor 200 is rotated, beads are rotated while stirring disperse media. In the present embodiment, the bead mill is a spike mill having a cylindrical rotor 200.

In the present embodiment, a mesh-shaped screen 400, which communicates with the outlet 120 of the vessel 100, is installed. Namely, the screen 400 having mesh holes allows only disperse media to pass and blocks the passage of beads.

The screen 400 may be installed to communicate with the outlet 120 at the outlet 120 side. In some embodiments, the screen 400 may be installed on the outer peripheral surface at the outlet side of the vessel.

In the present embodiment, the screen 400 was installed inside the rotor 200. Namely, in order to improve the dispersion efficiency by increasing the moving path of disperse media, an internal cavity 220 is formed at the outlet side of the rotor 200, and the screen 400 is installed inside the cavity 220. A communicating path, which communicates with the external side of the rotor, is installed in the internal cavity 220 so that disperse media, which are dispersed at the external side of the rotor, may be injected into the internal cavity 220 through the communicating path 210. The other side of the internal cavity 220 is connected to a connecting passage 150 communicating with the outlet 120. The disperse media may be separated from beads by installing the screen 400 along the inner circumference of the internal cavity 220. The disperse media, which are injected into the internal cavity via the screen 400, are discharged through the outlet 120 via the connecting passage 150. The size of the mesh holes of the screen 400 may be determined in an appropriate range in which only disperse media are allowed to pass, and beads are not allowed to pass, in consideration of the diameter of the beads.

In the present embodiment, an inner surface of a sidewall of the vessel 100 is formed as an inclined portion 140 which is inclined at a predetermined angle for an axis of the rotor. Namely, the inner diameter at the inlet side of the vessel 100 is large, but the inner diameter gradually decreases toward the outlet side in the inclined portion 140. Hence, in the present embodiment, force is applied to the beads in a direction opposite to the moving direction of materials by the inner surface of the sidewall of the inclined portion 140.

Hereinafter, a method of dispersing conductive materials of the present invention, the operation of the horizontal bead mill, and embodiments will be explained with reference to FIGS. 3 and 4.

First, a conductive material dispersion liquid is injected into the vessel 100 filled with beads through the inlet 110. The dispersion liquid is then vertically dispersed in the vessel 100 and is horizontally moved toward the outlet 120.

In order to disperse the dispersion liquid, the beads are rotated by rotating the rotor 200 in the vessel 100 using the driving unit 300. At this time, conductive material particles agglomerated in the dispersion liquid receive energy by rotation of beads and are dispersed into individual particles.

On the other hand, the bead particles collide with the inclined portion 140, and force is applied to the bead particles in a direction opposite to the moving direction of the disperse media. As such, it is possible to prevent the increase of the bead density at an area around the outlet 120.

The conductive material dispersion liquid dispersed in the vessel 100 is discharged through the outlet 120 via the slit 130 near the outlet 120 (see FIG. 3) or is discharged through the outlet 120 via the screen 400 in the internal cavity 220 of the rotor (see FIG. 4).

Example

A conductive material dispersion liquid was injected into the horizontal bead mill of FIG. 3, and the dispersion job was performed. Carbon black and CNT were used as conductive materials. For reference, the viscosity of the conductive material dispersion liquid, at which the present invention can be applied, is about between thousands of cps and 30,000 cps. If the viscosity exceeds the range, the fluidity of the dispersion liquid decreases, and the dispersion cannot be efficiently performed.

The experiment was conducted while changing the moving speed of materials of the conductive material dispersion liquid in the horizontal bead mill. The experiment was conducted at the moving speed of 2 L/min and 3 L/min. Further, the dispersion experiment was conducted in the horizontal bead mill which has different inclined angles of the inclined portion of the inner surface of the sidewall of the vessel at each moving speed of materials. The dispersion efficiency of the carbon black dispersion liquid and CNT dispersion liquid according to the angle between the rotor and the inner surface of the sidewall of the vessel was compared as shown in Table 1 below.

TABLE 1

|  | Vessel/ rotor angle | Moving speed of materials [L/min] | Carbon black disperse particle size D50 [μm] | CNT disperse particle size D50 [μm] |
| --- | --- | --- | --- | --- |
| Comparative Example 1 | 0 | 2 | 1.3 | 6.5 |
| Example 1 | 1° | 2 | 1.4 | 6.7 |
| Comparative Example 2 | 0 | 3 | 1.7 | 7.3 |
| Example 2 | 1° | 3 | 1.4 | 6.6 |
| Example 3 | 2° | 3 | 1.3 | 6.5 |
| Example 4 | 3° | 3 | 1.4 | 6.7 |
| Comparative Example 3 | 4° | 3 | 2.1 | 7.8 |

The disperse particle size of the carbon black and CNT is the medium particle size D50 which is the particle size at the time when the cumulative percentage reaches 50%.

As a result of comparison between comparative example 1 and example 1, when the moving speed of materials is 2 L/min., there was no dispersion improvement effect according to the angle adjustment of the inclined portion, and there was no phenomenon that the bead density increases toward the outlet in the vessel.

As a result of comparison between comparative example 2 and example 2, when the moving speed of materials is 3 L/min., the disperse particle size of examples 2 to 4 was smaller than that of the comparative example 2 (conventional bead mill without inclined angle). As such, it was seen that the dispersion efficiency of examples 2 to 4 was greater than that of the comparative example 2.

As in the comparative example 3, if the angle of the inclined portion was to set to 4 degrees, the angle between the rotor and the inner surface of the vessel was too large, and the shearing action was weakened, so the disperse particle size rather increased.

As such, it is seen that when the moving speed of materials is greater than 2.0 to 3.0 L/min, having an inclined angle of 1 to 3 degrees is advantageous for the dispersion.

It was understood from the above that the disperse particle size of materials decreased and the dispersion efficiency was improved by the horizontal bead mill for dispersing secondary battery materials of the present invention. This seems to be because of preventing a phenomenon that the beads are piled up at an area around the outlet by forming the inner surface of the sidewall of the vessel as the inclined portion as described above.

In addition to the above-described embodiments, various modifications may be made within a range that can achieve the objects of the present invention. For example, a flow path for cooling water can be formed in the rotor. Since heat is generated according to the rotation of the rotor, rotation of beads and the movement of materials, the temperature of the inside of the vessel could be reduced by forming a predetermined flow path for cooling water inside th rotor.

Further, it is possible to enhance stirring/dispersion effects by forming bumps on the surface of the rotor. The bumps may be formed on the surface of a drum-shaped rotor of a spike mill or may also be formed on the surface of the disk installed on the axis of the rotor of a disk mill.

Further, an example, in which the present invention is applied to a spike mill including a drum-shaped rotor, is exampled with reference to FIGS. 3 and 4, but the present invention may also be applied to a pin mill or the disk mill of FIG. 1. When the moving speed of materials increases in the horizontal bead mill, the beads increase in an area near the outlet regardless of the type of the rotor as shown in FIG. 2. Hence, there is a technical meaning to application of the present invention. Particularly, since a large amount of beads are put in a space between the vessel and the rotor, more beads may be moved in a direction in which materials are moved in the disk mill than in the spike mill. Hence, in the case of a disk mill, it may be better to form the inclined portion of the inner surface of the sidewall of the vessel of the present invention.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS 10, 100: vessel
11, 110: inlet
12, 120: outlet
13, 130: slit
14: inner surface of sidewall of vessel
140: inner surface of sidewall of vessel (inclined portion)
150: connecting passage
200: rotor
210: communicating path
220: internal cavity
300: driving unit
400: screen

The invention claimed is:

1. A method of dispersing conductive materials using a horizontal bead mill for dispersing secondary battery materials comprising:
    injecting a conductive material dispersion liquid into a vessel filled with beads;
    dispersing conductive materials in the conductive material dispersion liquid by rotating the beads by rotating a rotor in the vessel; and
    discharging the dispersed conductive materials in the conductive material dispersion liquid to an outlet of the vessel,
    wherein during the dispersing of the conductive materials, the beads rotated by the rotor collide with an inclined inner surface of a sidewall of the vessel to allow force to be applied in a direction opposite to a moving direction of the conductive material dispersion liquid,
    wherein a predetermined angle between the inclined inner surface of the sidewall of the vessel and an axis of the rotor is in a range of 1 to 3 degrees, and
    wherein a moving speed of the conductive material dispersion liquid is greater than 2.0 and less than or equal to 3.0 L/min.

2. The method of claim 1, wherein the conductive material dispersion liquid is obtained from conductive material particles contained in a secondary battery electrode slurry dispersed in a solvent.

3. The method of claim 2, wherein binder particles are contained in the conductive material dispersion liquid.

4. The method of claim 1, wherein the conductive material dispersion liquid includes melted binders contained in a secondary battery electrode slurry, and the melted binders contain non-melted microgel binder particles.

5. The method of claim 2, wherein a diameter of each of the beads is in a range of 0.5 to 1 mm.

6. The method of claim 1, wherein a slit communicating with the outlet is formed adjacent to the outlet of the vessel, and the slit has a diameter through which only the disperse media selectively passes.

7. The method of claim 1, wherein a mesh-shaped screen communicating with the outlet is installed adjacent to the outlet of the vessel,
    wherein the screen has mesh holes through which only the disperse media are allowed to pass.

8. The method of claim 7, wherein an internal cavity, which communicates with the outlet and an outside of the rotor, respectively, is formed at an outlet side of the rotor,
    wherein the mesh-shaped screen is installed in the internal cavity.

9. The method of claim 1, wherein the rotor has a flow path for cooling water.

10. The method of claim 1, wherein bumps are formed on a surface of the rotor.

11. The method of claim 1, wherein the bead mill is a spike mill, and wherein the rotor is a cylindrical rotor.

12. The method of claim 1, wherein the bead mill is a disk mill which includes a disk-shaped stirring blade around the axis of the rotor.

* * * * *